Sheet 1 2-Sheets

J. Tustin.
Harvester Rake.

Nº 2715
Nº 33719

Patented Nov. 12, 1861.

Witnesses
J. W. Coomby
J. Tuck

Inventor
John Tustin
by Munn & Co Atty

Sheet 2-2 Sheets.
J. Tustin.
Harvester Rake.
N° 2715
N° 33719
Patented Nov. 12, 1861.
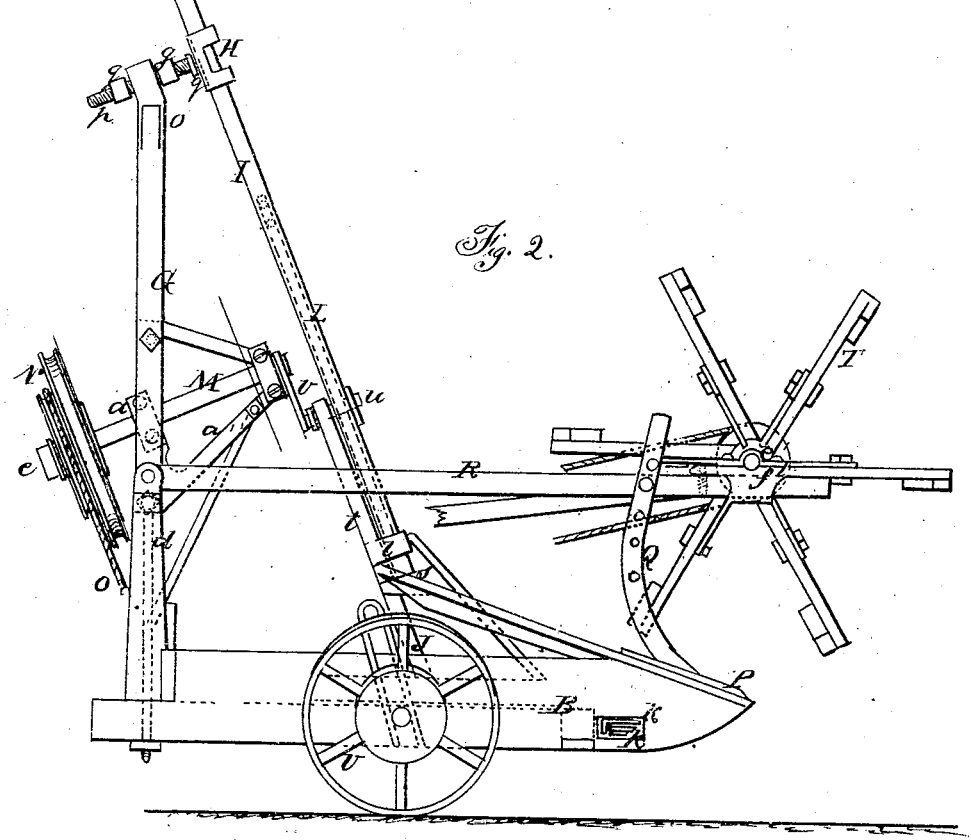
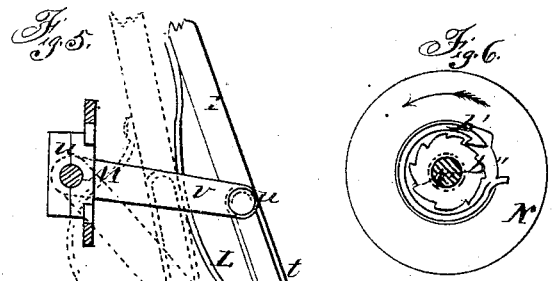
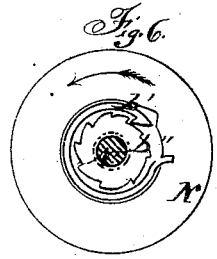

UNITED STATES PATENT OFFICE.

JOHN TUSTIN, OF PETALUMA, CALIFORNIA.

IMPROVEMENT IN REAPING-MACHINES.

Specification forming part of Letters Patent No. 33,719, dated November 12, 1861.

*To all whom it may concern:*

Be it known that I, JOHN TUSTIN, of Petaluma, in the county of Sonoma and State of California, have invented certain new and useful Improvements in Reaping-Machines; and I do hereby declare that the following is a full, clear, and exact description of the same, reference being had to the annexed drawings, making a part of this specification, in which—

Figure 1:
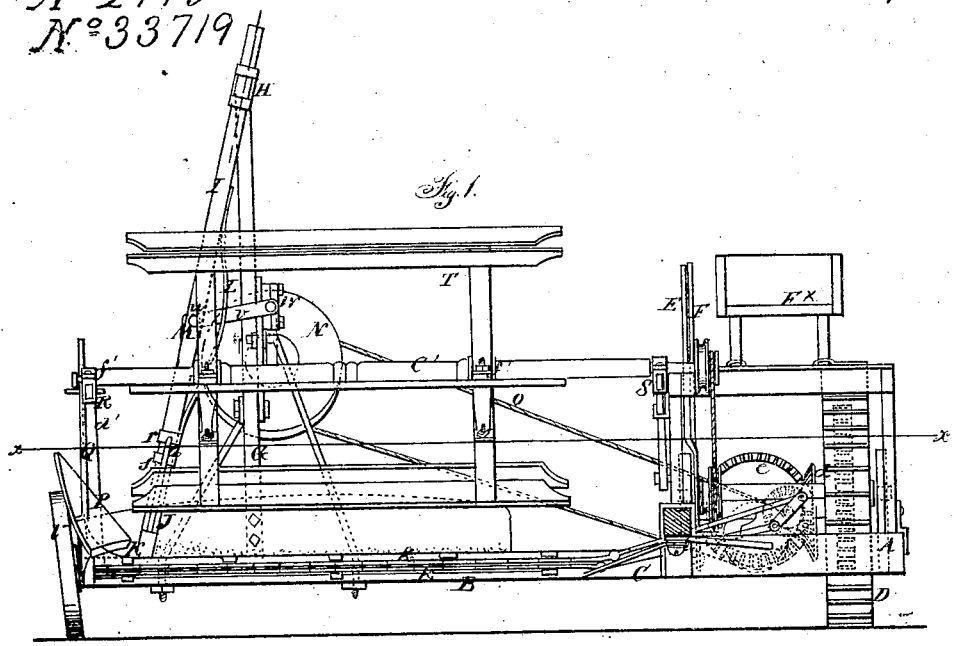
Figure 3:
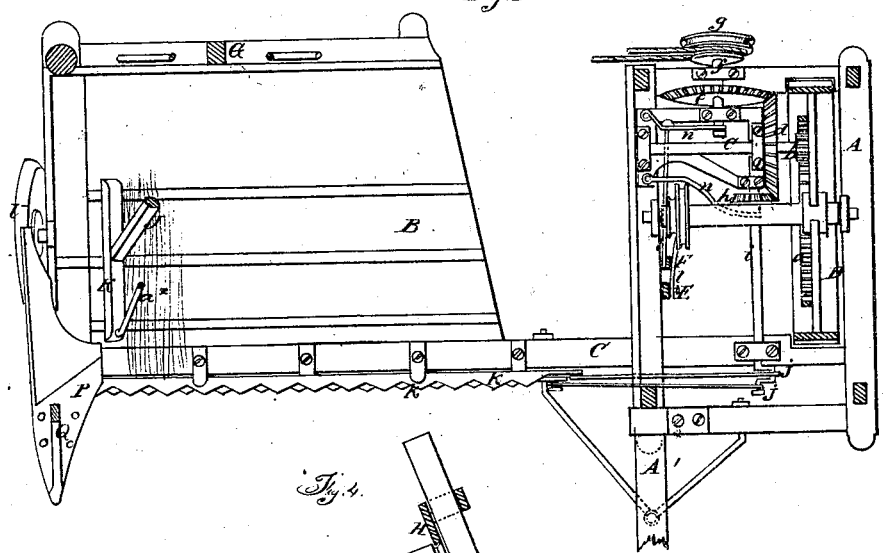
Figure 4:
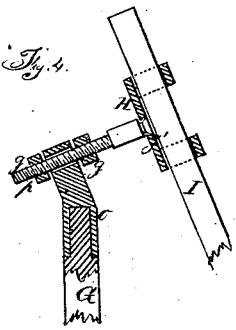

Figure 1 is a front view of my invention; Fig. 2, a side view of the same; Fig. 3, a horizontal section of the same, taken in the line $x$ $x$, Fig. 1; Figs. 4, 5, and 6, detached sectional views of portions of the raking device.

Similar letters of reference indicate corresponding parts in the several figures.

This invention relates to an improved raking device so constructed and arranged as to admit of being adjusted to suit the height or length of the grain and operate perfectly at all times, it being necessary, in order to insure this result, that the rake or shoe strike the cut grain about midway of the length of the latter, and that the rake or shoe arm be properly guided and sustained at all points of its movement, all retrograde movement avoided, and the cut grain raked from the platform in gavels of uniform size.

To enable those skilled in the art to fully understand and construct my invention, I will proceed to describe it.

A represents the main frame of a reaper, and B the platform, the latter being attached to the former by the sickle-bar C.

D is the driving-wheel, which is placed in the main frame A, and has a toothed wheel, $a$, attached concentrically to its inner side, the wheel $a$ being toothed at its inner periphery, as shown in Fig. 3, and having a pinion, $b$, gearing into it, said pinion being on a shaft, $c$, which has a bevel-wheel, $d$, on it. The wheel $d$ gears into a corresponding wheel, $e$, on a shaft, $f$, placed longitudinally in the main frame and having a cone of pulleys, $g$, on its outer end. A pinion, $h$, also gears into the wheel $d$, said pinion being on a shaft, $i$, which is also placed longitudinally in the main frame and has two cranks, $j\ j$, at its front end, from which two reciprocating sickles, $k\ k$, are driven, one sickle being placed over the other, and the cranks having reverse positions, so that the two sickles will work simultaneously in opposite directions. The two shafts $f\ i$ are allowed to slide in their bearings so that either may be rendered inoperative, when desired, by simply throwing its wheel out of gear with the wheel $d$ of shaft $c$, the movement of the shafts $f\ i$ being effected by means of levers E F, which are within convenient reach of the driver on his seat F$^\times$ on the main frame A, the levers E F being connected by arms $l$ and levers $n\ n$ to their respective shafts. (See Fig. 3.)

To the back part of the platform B there is attached an upright, G. This upright has a socket, $o$, on its upper end, the upper part of which socket is inclined backward or outward and has a screw, $p$, passing through it at right angles, said screw having two jam-nuts, $q\ q$, upon it, one at each side of the socket. (See Fig. 4.) On the front end of the screw $p$ there is placed a guide, H, in which a bar, I, is fitted and allowed to slide freely up and down. The guide H is attached to the screw $p$ by a swivel-connection, $q'$, to admit of the guide turning freely on the screw. (See Fig. 4.) The bar I is fitted at its lower part in a guide, $r$, which is attached to a bar, J, of a rake or shoe, K, and the lower end of bar I has a guide, $s$, attached, which fits on or over bar J. The upper end of the rake-bar J has an oblong metal loop or guide, $t$, attached, through which the pin $u$ of a crank, $v$, passes loosely, said pin $u$ passing through the bar I. The shoe K is simply a bar attached to the bar I at such an angle as to be parallel with the upper surface of the platform B. The shoe is braced by an inclined rod, $a^\times$.

L is a spring, the upper end of which is attached to the bar I, and the lower end resting or bearing on the guide $t$ of bar J. This spring has a tendency to keep the rake or shoe K in contact with the platform.

The crank $v$ is attached to a shaft, M, the bearings $w$ of which are attached one to the upright G and another to a metallic bracket or frame, $a'$, secured to the upright. On the outer end of the shaft M there is placed a cone of pulleys, N—two or more—around which and the cone $g$ of shaft $f$ a band, O, passes. The cone N is placed loosely on the shaft M, the cone being provided at its center with a pawl, $b'$, which engages with a ratchet, $b''$, on shaft M, the ratchet and pawl being fitted in a circular recess made concentrically in the inner side of the cone. (See Fig. 6.) The cone N is secured on the shaft M by a nut, $c'$.

P represents the shoe at the outer or grain end of the platform B, and Q is a curved bar, the lower end of which is attached to the shoe P, and the upper end connected to a bar, R, the back end of which is hinged to an upright, $d'$, at the back part of the platform. A bar, S, similar to R, is attached to the inner side of the main frame A, and said bars R S support the reel T, which may be constructed in the usual way. The shaft $e'$ of the reel has its journals fitted in bearings $f'$, fitted on the bars R S, so that they may slide back and forth thereon and be secured at any desired point in a horizontal direction while the vertical adjustment of the bars R S admit of the reel being raised and lowered. The bar Q performs two functions—viz., it serves as a support to the bar R and also serves to divide the standing grain from that which is to be cut. The bar R serves also mutually to support the divider Q, rendering the latter stiff and firm. The outer end of the platform B is provided with a grain-wheel, U.

By having the sickle-driving and rake-driving gearing arranged as shown and described either the sickles or the rake may be rendered inoperative, or both rendered operative or inoperative simultaneously as desired. By this arrangement, also, the gearing may be placed at the back of the axle of the driving-wheel D and at the left side of the draft-pole A×, so as to counteract in a great degree side draft, and also counteract the downward tendency of the sickles in cutting.

By having the cone of pulleys N placed loosely on the shaft M and connected thereto by the ratchet and pawl, as shown, a retrograde movement of the rake or shoe K is avoided, as the cone N will turn backward independently of shaft M. This is an important feature of the invention, for in backing the machine the cut grain will not be discharged from the platform. The shoe or rake K is moved over the surface of the platform B, and also elevated and passed to the grain or outer end thereof by the revolutions of the crank $v$, the spring L, as previously mentioned, keeping the shoe or rake in contact with the platform during the working movement of the former.

By adjusting the jam-nuts $q\ q$ on screw $p$ the shoe or rake K may be adjusted nearer to or farther from the sickle, as may be required, in order that the shoe or rake may strike or act upon the grain at about its center, and thereby insure the grain being evenly raked off the platform in gavels parallel with the line of movement of the machine.

I am aware that a pawl-and-ratchet connection has previously been employed to drive an automatic rake in harvesting-machines, and do not, therefore, desire to be understood as claiming such invention, broadly; but,

Having thus described my invention, what I claim as new, and desire to secure by Letters Patent, is—

1. Connecting the swivel-guide H to the upright G by means of a screw, $p$, passing through a nut or socket, $o$, on the upright, and provided with jam-nuts $q\ q$, substantially as shown, for the purpose of adjusting the shoe or rake R farther forward or backward on the platform B, as may be desired.

2. The arrangement and combination of the two bars I J and spring L with the guide H and crank $v$ of shaft M, all constructed and employed in the manner explained, to admit of the operation of the shoe or rake K on the platform B, as set forth.

JOHN TUSTIN.

Witnesses:
S. TUSTIN,
A. SELVESTER.